(12) United States Patent
Deleris et al.

(10) Patent No.: US 9,195,375 B2
(45) Date of Patent: Nov. 24, 2015

(54) METHOD AND SYSTEM FOR MONITORING A GRAPHICAL INTERFACE IN AN AIRCRAFT COCKPIT

(71) Applicant: AIRBUS OPERATIONS (SAS), Toulouse (FR)

(72) Inventors: Yannick Deleris, Grenade (FR); Adrienne Tankeu Choitat, Toulouse (FR); Sofyan Su, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 322 days.

(21) Appl. No.: 13/692,221

(22) Filed: Dec. 3, 2012

(65) Prior Publication Data

US 2013/0179842 A1    Jul. 11, 2013

(30) Foreign Application Priority Data

Dec. 1, 2011    (FR) ...................................... 11 61048

(51) Int. Cl.
*G06F 3/0484* (2013.01)
*G06F 9/44* (2006.01)
*G06F 11/30* (2006.01)

(52) U.S. Cl.
CPC ............ *G06F 3/0484* (2013.01); *G06F 9/4443* (2013.01); *G06F 11/302* (2013.01); *G06F 11/3013* (2013.01); *G06F 11/3089* (2013.01)

(58) Field of Classification Search
CPC ............ G06F 17/2247; G06F 17/2241; G06F 17/30327; G06F 17/30961; G06F 11/3051; G06F 9/4428; G06F 9/4435; G06F 17/227
See application file for complete search history.

(56) References Cited

U.S. PATENT DOCUMENTS

| 4,028,681 A * | 6/1977 | Vittorelli ........................ 715/210 |
| 2003/0156137 A1* | 8/2003 | Von Essen et al. ............. 345/771 |
| 2009/0002764 A1* | 1/2009 | Atkins et al. ................... 358/1.18 |

FOREIGN PATENT DOCUMENTS

WO    WO 2011/017063    2/2011

OTHER PUBLICATIONS

French Search Report for FR Application 1161048, dated Aug. 23, 2012.

(Continued)

*Primary Examiner* — Jennifer To
*Assistant Examiner* — Terri Filosi
(74) *Attorney, Agent, or Firm* — Nixon & Vanderhye P.C.

(57) ABSTRACT

The invention relates in particular to a method and a system for monitoring a graphical interface in a computer system of an aircraft cockpit. The method comprises, in addition to the display of a graphical interface of a client application based on a tree structure of graphical interaction objects composing said graphical interface, the following steps: obtaining a plurality of graphical interaction objects having a tree-structure organization; creating and adding, to said obtained tree structure, at least one new graphical interaction object defining a critical graphical display zone; modifying the tree-structure dependency of at least one critical graphical interaction object, of the obtained tree structure to make it dependent from the new graphical interaction object defining the critical zone; and performing critical monitoring only of the critical graphical objects attached to the critical zone.

14 Claims, 12 Drawing Sheets

(56) References Cited

OTHER PUBLICATIONS

Navarre, D. et al., "Designing for Resilience to Hardware Failures in Interactive Systems: A Model and Simulation-Bases Approach", Reliability Engineering & System Safety, vol. 96, No. 1, (Jan. 1, 2011), pp. 38-52.
Choitat, T.A. et al., "Self-Checking Widgets for Interactive Cockpits", EWDC '11 Proceedings of the 13th European Workshop on Dependable Computing, (May 11, 2011), pp. 43-48.

* cited by examiner

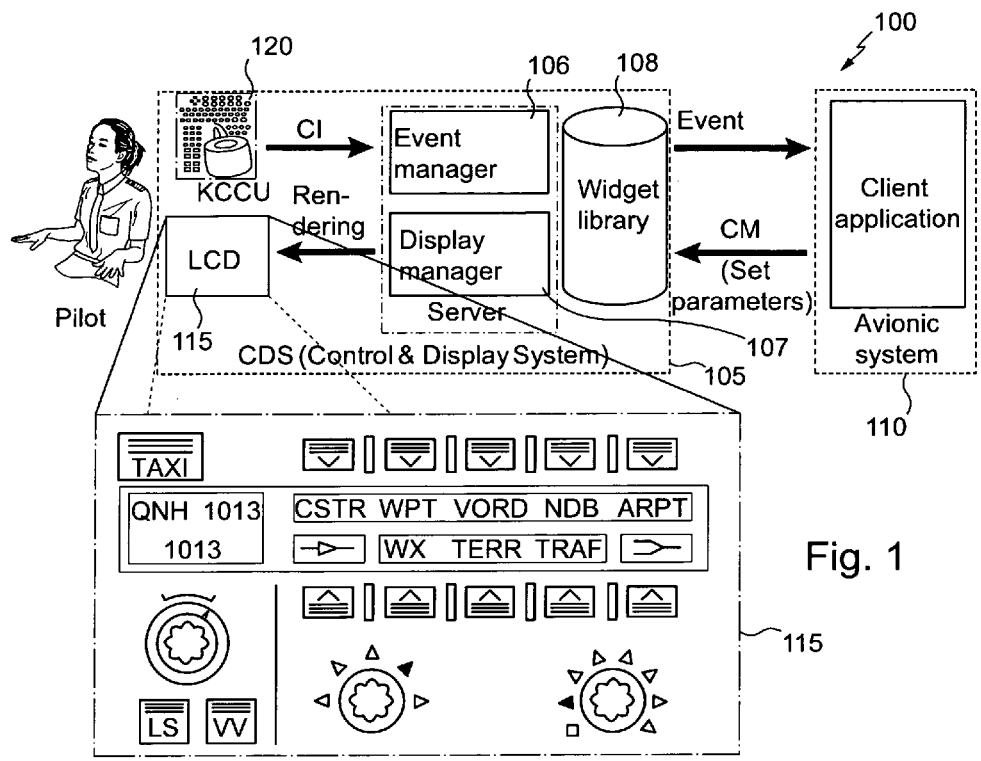
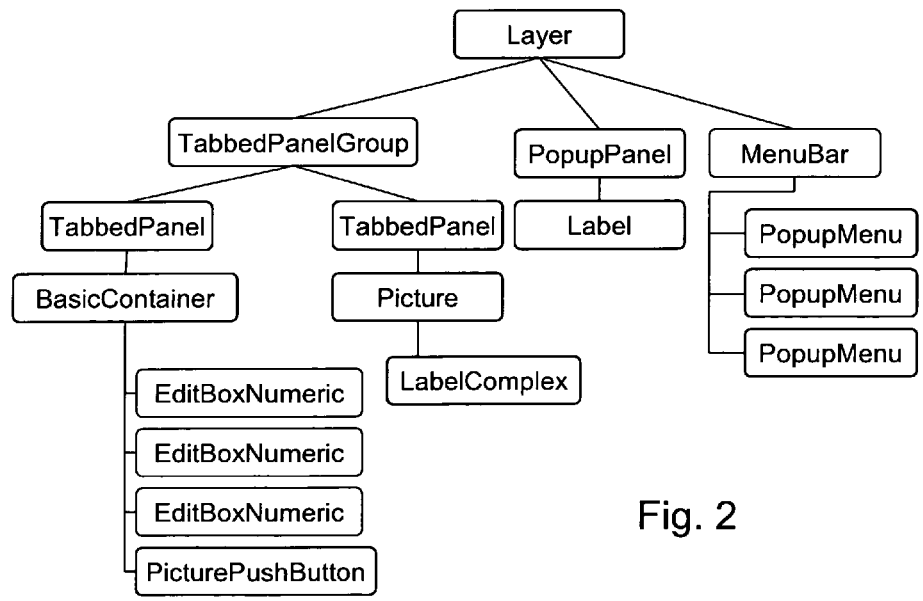
Fig. 1
Fig. 2

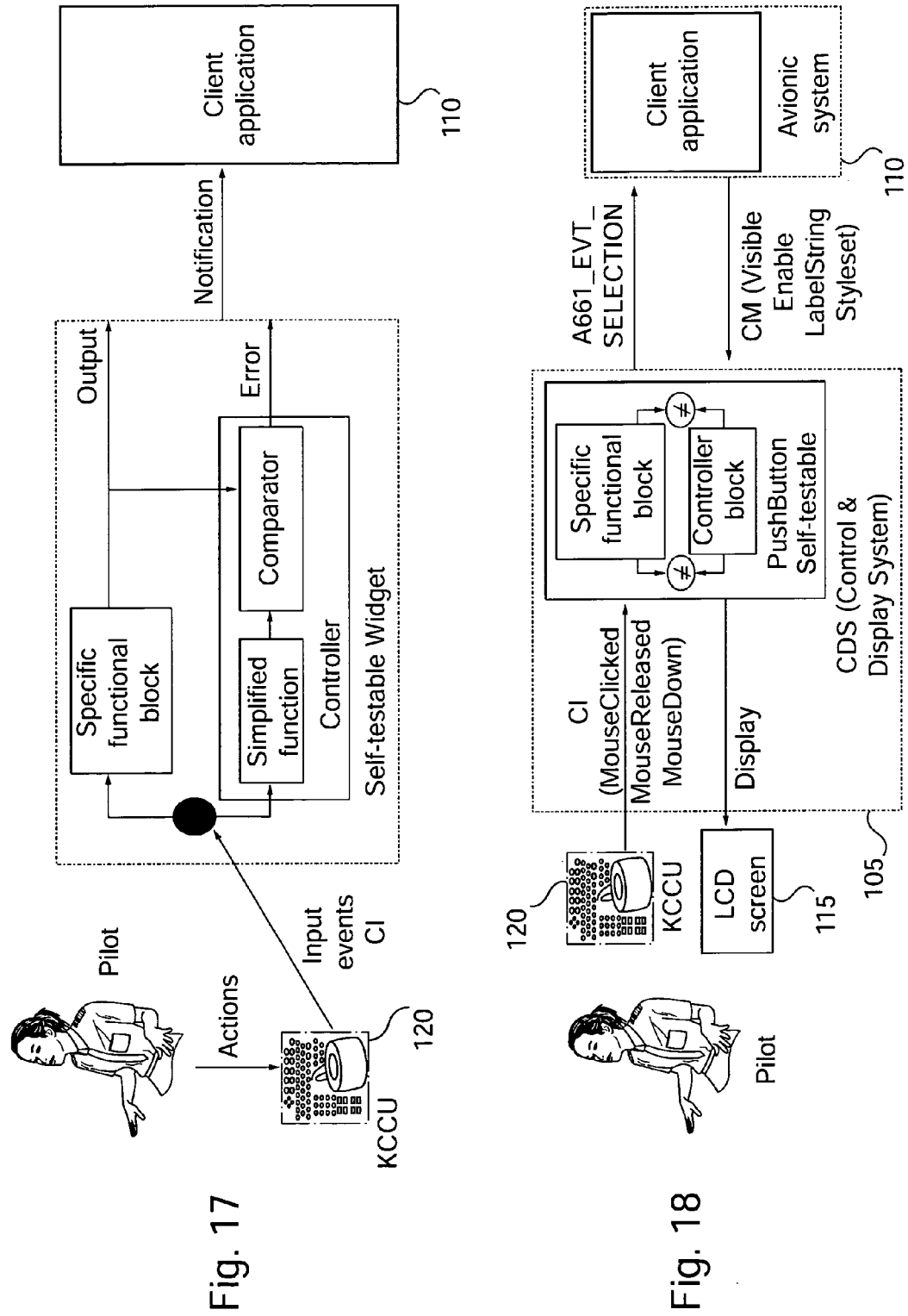

METHOD AND SYSTEM FOR MONITORING A GRAPHICAL INTERFACE IN AN AIRCRAFT COCKPIT

This application claims priority from French application No. 11 61048 filed on Dec. 1, 2011, which application is incorporated herein by reference.

FIELD OF THE INVENTION

The present invention concerns graphical interfaces for interacting with client applications in computer systems and more particularly a method and a system for monitoring a graphical interface in a computer system of an aircraft cockpit.

CONTEXT OF THE INVENTION

Avionic display systems, also called CDS (standing for Control and Display System) have greatly evolved in their functionalities over the last few years. Whereas they originally consisted of simple viewing systems (display function), they today enable interactivity with the crew by enabling, in particular, crew members to perform operations defined in client applications, that is to say to control those applications, through input and selection means such as a keyboard and a pointing device of trackball type.

FIG. 1 is a diagrammatic illustration of the architecture of a hardware configuration for control and display in an aircraft cockpit. As illustrated, the hardware configuration 100 comprises at least one computer 105 hosting a server for management of graphical object display (CDS) linked, via a communication network such as Ethernet or ARINC 429, to an avionic system 110 comprising avionic applications referred to as client avionic applications, at least one screen 115, for example an LCD screen (LCD standing for Liquid Crystal Display) and, in particular if that screen is not sensitive, input and selection means 120, also called a KCCU (standing for Keyboard and Cursor Control Unit). The input and selection means 120 are, for example, connected to the CDS 105 via a private network which may be of CAN type (CAN standing for Controller Area Network).

The graphical object display management server comprises a manager 106 of events from the input peripherals and a display manager 107 to manage the display of the graphical interfaces on the basis of instructions of the client applications and interactions with the crew, for example the pilot.

The graphical interface or "man-machine interface" of a client application may in particular be defined by a tree structure of elementary graphical interaction objects (buttons, input fields, menus, etc.), also known as "widgets", themselves defined within a local library of elementary graphical objects 108. This tree structure organizes the graphical objects hierarchically from a root object, called "layer", defining the display area dedicated to the client application for the plotting of its man-machine interface, up to the graphical objects to display at the very front of the foreground. Each widget obtains from the display manager 107 a drawing area on which it may draw itself, thereby constituting the man-machine interface of the client application.

The widgets may be interactive, that is to say that they may accept and react to actions of the crew.

ARINC 661 is a standard which specifies the interface between the CDS 105 and the avionic system 110. According to ARINC 661, each graphical interlace of the cockpit is instantiated on the basis of a binary file named DF (definition file) defining the structure of the tree structure of the widgets that compose the screens. FIG. 2 illustrates a first tree structure example for widgets according to ARINC 661.

The avionic system 110 executes, for example, applications such as flight management applications, parameters of which may be displayed and/or modified by members of the crew, as shown in the Figure.

FIG. 3 represents a tree structure example for widgets for a control panel (graphical interface) of an Electronic Flight Instrument System (EFIS) represented in FIG. 1. Such a control panel enables a certain number of parameters to be driven for the EFIS displays.

The parameters may thus be sent from the avionic system to the CDS 105, in charge of displaying them on the screen 115. If the pilot wishes to modify a value or actuate an element, he interacts, via the input and selection means 120, on the displayed graphical interface (on the displayed widgets) to select that value or element and, where appropriate, modify the value. An interaction command CI is then sent by the input and selection means 120 to the event manager 106 of the CDS 105 to perform that selection and/or modification. The modified value is then sent ("event" message) by the CDS to the avionic system which may then use it. At the same time the display of the element may be updated by the generation of a display instruction on the basis of the interaction command CI.

The use of the value modified by a client application of the avionic system 110 may lead to a modification of the display on the graphical interface. An update message or command CM may thus be sent again to the CDS 105 to update the display on the screen 115 with new parameters ("set_parameters"). This command CM identifies in particular the widget to update by an unique identifier of that widget, and enables the generation of corresponding display instructions.

Thus, the CDS may be considered as a display resource for data coming from the avionics. The CDS and the avionics exchange information with each other to update displayed elements and notify events to the members of the crew. ARINC 661 also defines a communication protocol for communication between the avionic system 110 and the CDS 105, enabling the avionic system to send those CM modifications for widgets to the CDS and enabling the CDS to send back the user events CI to the avionic system.

Certain actions on the graphical control interfaces may have consequences on the integrity of the aircraft or of its passengers if they are performed outside their context of use or if they turn out to be defective.

The table below illustrates certain feared defects: erroneous and inadvertent controls, and also erroneous and inadvertent displays.

TABLE 1

| Stream categories | Feared defects |
| --- | --- |
| Control stream (from the CDS 105 to the avionics 110). | An erroneous control, that is to say the sending of an erroneous control to the client application further to an action of the operator on the input and selection means 120.<br>An inadvertent control, that is to say the sending of a control to the client application without any action of the user on the input and selection means 120. |
| Display stream (from the avionics 110 to the CDS 105). | An erroneous display, that is to say the erroneous display of an item of information sent by the client applications to the output peripherals (screens).<br>An inadvertent display, that is to say the update and display of a parameter on the output peripherals (screens) by the CDS whereas no command had been received from the client application. |

To establish monitoring of all the functions, that is to say all the widgets, of a client application may turn out to be difficult, in particular on account of high processing resource requirements.

To be precise, the number of widgets may turn out to be high according to the applications, whereas the number of widgets capable of having an impact on the integrity of the aircraft and of its passengers is relatively low. For example, for an FMS graphical interface (FMS standing for "Flight Management System"), fewer than 10 widgets turn out to be critical out of the 3500 widgets constituting that interface. Similarly, for a ceiling panel, less than 20 widgets are critical out of a total of 400 widgets constituting the graphical interface.

Furthermore, there are interactions between the widgets, typically, from a parent widget to the state of its child widgets, such that, the monitoring of the control stream coming from the client application proves to be much more complex than the mere monitoring of each widget taken independently. FIG. 4 illustrates this influence in an example in which the state of the child widget W3 depends on the commands 1 and 2 received by its parent widgets W1 and W2. The monitoring of the widget W3 would consequently require that of the widgets W1 and W2. This dependency thus generally requires monitoring of all the widgets.

Furthermore, it is possible for the protocol for exchange of command streams according to ARINC 661 not to define the placing in order of the commands relative to each other, whereas several commands may modify the state of the same widget parameter (furthermore in a manner that may be different according to the state of the widget).

To face up to this monitoring complexity, the display and control systems of the cockpits used in the last few decades have limited the interactivity of the user to functions or widgets referred to as non-critical the worst consequence of which is an increase in work-load of the pilots, without any impact on the integrity of the aircraft and of its passengers. This limitation results from the delimitation, on the screens or graphical interfaces, of interaction zones to just the zones corresponding to non-critical functions. In other words, the graphical interface is heterogeneous in that at the same time it has zones accessible by the means for input and selection 120 (the non-critical widgets) and others where the use of those means 120 is prohibited (the critical widgets).

However, an objective today is to extend this interactivity to the critical functions and widgets.

It has been possible to propose a few solutions, for example such as the setting up of requests for message confirmation as described in the publication FR 2 931 329. This proposal is however of little practicality since it is strongly dependent on the hardware and software architecture of the CDS and is limited solely to certain predefined commands.

SUMMARY OF THE INVENTION

The present invention enables at least one of the drawbacks set out above to be mitigated. It relates in particular to a method and a system for monitoring a graphical interface in a computer system of an aircraft cockpit. The invention is directed in particular to the monitoring of graphical interfaces displayed for the interaction (via a touch screen or a simple screen combined with input and selection means of keyboard and mouse type) with a client application and which graphical interfaces are defined by a tree structure of elementary graphical interaction objects or "widgets".

The invention thus relates to a method of monitoring a graphical interface in a computer system of an aircraft cockpit, comprising the display of a graphical interface of a client application on the basis of a tree structure of graphical interaction objects composing said graphical interface, said method being characterized in that it comprises the following steps:
- obtaining a plurality of graphical interaction objects having a tree-structure organization;
- creating and adding, to said obtained tree structure, at least one new graphical interaction object defining a critical graphical display zone;
- modifying the tree-structure dependency of at least one critical graphical interaction object, of the obtained tree structure to make it dependent from the new graphical interaction object defining the critical zone; and
- performing critical monitoring only of the critical graphical objects attached to the critical zone.

The method according to the invention thus makes it possible to optimize the critical graphical objects (widgets) to be monitored thanks to the creation of a critical zone to which they are directly attached. Thus, the perimeter of critical monitoring is limited to that zone, regardless of the commands received for the other graphical objects (that is to say the non-critical objects). It should be noted that the decision as to whether a graphical object is critical or not for it to be included in that critical zone may be taken manually in advance by a user trained in that respect, for example a safety manager, in particular according to the interdependencies between objects as described above.

Furthermore, the critical monitoring is rendered independent of the initial architecture of the graphical interface since the tree structure is adjusted according to the criticality of the graphical objects.

Obtaining effective monitoring of the critical graphical objects (functions) according to the invention thus makes it possible to render the graphical interaction interfaces tolerant of possible faults of the CDS or of the avionic system hosting the client applications.

Such a method is generic, and may be implemented to monitor the graphical interfaces of any aircraft system.

It should be noted that the other objects of the tree structure may also be subjected to monitoring (non-critical) of lesser degree than the monitoring that is referred to as critical (that is to say requiring less resources for example), even if they are preferably not subjected to any monitoring.

Advantageously, the new graphical interaction object defining the critical zone is directly attached to the root of the tree structure. The critical graphical objects subjected to monitoring are thereby totally isolated from the other non-critical objects. The conduct of the monitoring is thus simplified.

Furthermore, said created new graphical interaction object preferably defines a critical graphical zone corresponding to a display area distinct from the display areas of the non-critical graphical objects. This segregation in the display makes it possible to simplify the processing of interaction commands of a user on the display, via the input and selection means.

According to a particular feature, said created new graphical interaction object preferably comprises a Panel object from the ARINC 661 standard to which are attached said critical graphical objects. More particularly, this "Panel" object has the advantage of defining a rectangular display zone within which other objects, in this case the critical graphical objects, may be drawn. It will incidentally be noted that the "ParentIdent" property of this object may be set to 0 in order to attach that Panel object directly to the root of the tree structure as mentioned previously.

According to an embodiment of the invention, the method further comprises a step of sorting, among the received commands intended for the graphical interaction objects of the tree structure, between critical commands, intended for the critical graphical objects, and non-critical commands intended for the other graphical objects; and the critical monitoring is performed on the critical commands uniquely. This segregation of the received commands in advance makes it possible to reduce the resources necessary for said critical monitoring according to the invention.

The interaction commands of a user may for example be identified on the basis of the positioning of a pointer (mouse, touch screen) relative to a display area of said critical zone or of the active graphical object (for example in editing state) when input is made on a keyboard. The commands coming from the client application with which a user interacts (via the displayed graphical interface) may be easily sorted on the basis of for example a graphical object identifier that they contain.

According to a particular embodiment of the invention, the critical monitoring of a critical graphical object comprises, for a command received for that critical graphical object, the comparison between an output message from the critical graphical object in response to the received command and a theoretical output message determined by a monitoring module on the basis of the received command, and comprises generating an error message in case of negative comparison.

According to a particular feature, a critical graphical object is a data object comprising, in addition to a functional block corresponding to the specific function of the critical graphical object, a control block for performing said comparison. This control block is consequently an element constituting the monitoring module. According to this configuration the critical objects are thus autonomous in their control.

In particular, the control block of a critical graphical object comprises a simplified functional block for performing a simplified function of said function of the critical graphical object, and a comparator for comparing an output of the simplified functional block with a corresponding output of the functional block. This provision enables control at reduced cost to be achieved. To be precise, by making use of a simplification of the function of the object, the resources necessary for its control are reduced. In particular, the simplified function may be limited to the properties that it is wished to ensure, and dispense with the properties of lesser interest (for example the graphical rendering, such as the placing in "focus" of the object when the mouse pointer passes over it).

According to an embodiment of the invention, the method further comprises a step of identifying, on the basis of a configuration file, the critical graphical objects rendered or to be rendered dependent on the new graphical object from among the graphical objects of the tree structure. This configuration file may in particular be appended to the DF file referred to above.

As a variant, the method further comprises a step of identifying, on the basis of a range of identifiers that is reserved for the critical graphical objects, critical graphical objects rendered or to be rendered dependent from the new graphical object among the graphical objects of the tree structure. This provision is easy to implement and requires little resources for identifying the critical graphical objects.

The identification of the critical graphical objects is useful when attaching them to the created new graphical object, but also for sorting the commands received so as to only process those intended for the critical objects subjected to monitoring.

According to an embodiment of the invention, the display of the graphical interaction interface on the basis of the tree structure comprises a first step of executing display instructions relative to the non-critical graphical objects, followed by a second step of executing display instructions relative to the critical graphical objects. Here, all the non-critical graphical objects are displayed before all the critical graphical objects. The display is thus sequential, making it possible to ensure that no non-critical object will be displayed over the critical display zone. This provision contributes to simplifying the processing of segregating interaction commands triggered by a user.

As a variant, the method further comprises the steps of:
detecting when at least one non-critical graphical object is displayed with at least partial superposition on (that is to say over) the critical graphical zone comprising the critical graphical objects; and
inhibiting, for the duration of the superposition, functions of interaction of a user with the critical graphical objects.

This provision gives a high degree of security for the critical functions. More particularly, it is possible for monitoring modules which operate uniquely on the critical graphical objects not to have knowledge of the presence and of the type of superposing non-critical objects. There would thus be a risk that an item of information processed by those modules would be polluted by the presence of a non-critical object. The present provision thus avoids such a situation by inhibiting the interactions. The monitoring of the critical graphical objects may thus also be inhibited.

In particular, the method further comprises a step of triggering a countdown on detecting the superposition, and a step of generating a warning message on expiry of the countdown. Thus, the user may easily be warned to move the superposing non-critical graphical object and thus find again all the critical functions. The utilization of the countdown makes it possible to limit the time of the inability to access what is referred to as a critical function whereas in an aircraft it is recommended to have access to all the functions if necessary. The countdown may be of the order of a few seconds.

According to another particular feature, detecting the superposition comprises a step of updating a depth table when the display of the graphical interface (in particular the initial display) is updated, said depth table storing, for each display pixel, the depth of the least deep graphical object situated at the location of that pixel, and comprises a step of determining a pixel that belongs to said critical graphical zone and, at the same time, whose depth stored in the table corresponds to a non-critical graphical object.

The invention is also directed to a computer program comprising instructions adapted to the implementation of each of the steps of the method described earlier when said program is executed on a computer, a system comprising means adapted to the implementation of each of the steps of the method described earlier, as well as an aircraft comprising such a device.

The advantages procured by that computer program, that system and that aircraft are similar to those referred to above.

In particular, the invention also concerns a system for monitoring a graphical interface in a computer system of an aircraft cockpit, comprising a display module for controlling the display of a graphical interface of a client application on the basis of a tree structure of graphical interaction objects composing said graphical interface, this system being characterized in that that it comprises:
a means for obtaining a plurality of graphical interaction objects having a tree-structure organization;

a to-be-monitored critical graphical zone defining module for creating and adding, to said obtained tree structure, at least one new graphical interaction object defining a critical graphical zone for display, and for modifying the tree-structure dependency of at least one critical graphical interaction object of the obtained tree structure, so as to make it dependent from the new graphical interaction object defining the critical zone; and a critical graphical object monitoring module for performing critical monitoring only of the critical elementary graphical objects attached to said critical zone.

Advantageously, the definition module is arranged to directly attach the new graphical interaction object defining the critical zone to the root of the tree structure.

Furthermore, the definition module is arranged for defining, by said created new graphical interaction object, a critical graphical zone corresponding to a display area distinct from the display areas of the non-critical graphical objects.

According to a particular feature, said created new graphical interaction object preferably comprises a Panel object from the ARINC 661 standard to which are attached said critical graphical objects.

According to an embodiment of the invention, the system further comprises a module for sorting, among the received commands intended for the graphical interaction objects of the tree structure, between critical commands, intended for the critical graphical objects, and non-critical commands intended for the graphical objects; and the monitoring module operates on the critical commands uniquely.

According to a particular embodiment of the invention, the monitoring module comprises:

a theoretical determination module for determining, on the basis of a command received that is intended for a critical graphical object, a theoretical output message of said critical graphical object;

a comparator for comparing, for that received command, an output message of the critical graphical object in response to the received command and said theoretical output message; and a generation module for generating an error message in case of negative comparison.

According to a particular feature, a critical graphical object is a data object comprising, in addition to a functional block corresponding to the specific function of the critical graphical object, a control block for performing said comparison.

In particular, the control block of a critical graphical object includes a specific theoretical determination module for performing a simplified function of said function of the critical graphical object, and a specific comparator for comparing the theoretical output message of the theoretical determination module with a corresponding output of the functional block.

According to an embodiment of the invention, the display module of the graphical interaction interface on the basis of the tree structure is configured to first of all command the execution of display instructions relative to the non-critical graphical objects, then the execution of the display instructions relative to the critical graphical objects.

As a variant, the system further comprises:

a detection module for detecting a non-critical graphical object displayed with at least partial superposition on the critical graphical zone comprising the critical graphical objects; and an inhibition module for inhibiting, for the duration of the superposition, functions of interaction of a user with the critical graphical objects.

In particular, the inhibition module is configured to trigger a countdown on detecting the superposition, and generate a warning message on expiry of the countdown.

According to another feature particular, the detection module detects the superposition of objects on the basis of a depth table storing for each display pixel the depth of the least deep graphical object situated at the location of that pixel.

BRIEF DESCRIPTION OF THE DRAWINGS

Other advantages, objects and features of the present invention will emerge from the following detailed description, given by way of non-limiting example, relative to the accompanying drawings in which:

FIG. 1 is a diagrammatic illustration of the architecture of a hardware configuration for control and display in an aircraft cockpit.

FIG. 2 illustrates a tree structure example for widgets according to the ARINC 661 standard.

FIG. 17 illustrates the monitoring, by a self-testable widget, of a stream of user interaction commands, according to the invention;

FIG. 18 illustrates a particular case of a self-testable widget according to the invention, deriving from the "PushButton" widget of ARINC 661;

DETAILED DESCRIPTION OF EMBODIMENTS OF THE INVENTION

To effectively monitor the graphical interaction objects, or "widgets", of a graphical interface that is displayed on the basis of a tree structure of those graphical objects, the invention implements segregation of all of the graphical objects referred to as critical (those to monitor) from all the graphical objects, using a new graphical object introduced into that tree structure.

The object of this new graphical object is to define a critical graphical zone which is alone to be monitored. Thus only the critical graphical objects which will be attached to this new graphical object may be monitored, in this way avoiding having to take into account the other graphical objects referred to as non-critical.

The invention furthermore minimizes the constraints on the client application, as will be seen below.

A monitoring system, including in particular a monitoring software application, in the CDS 105, implements the monitoring method according to the invention as described below.

Figure 5:
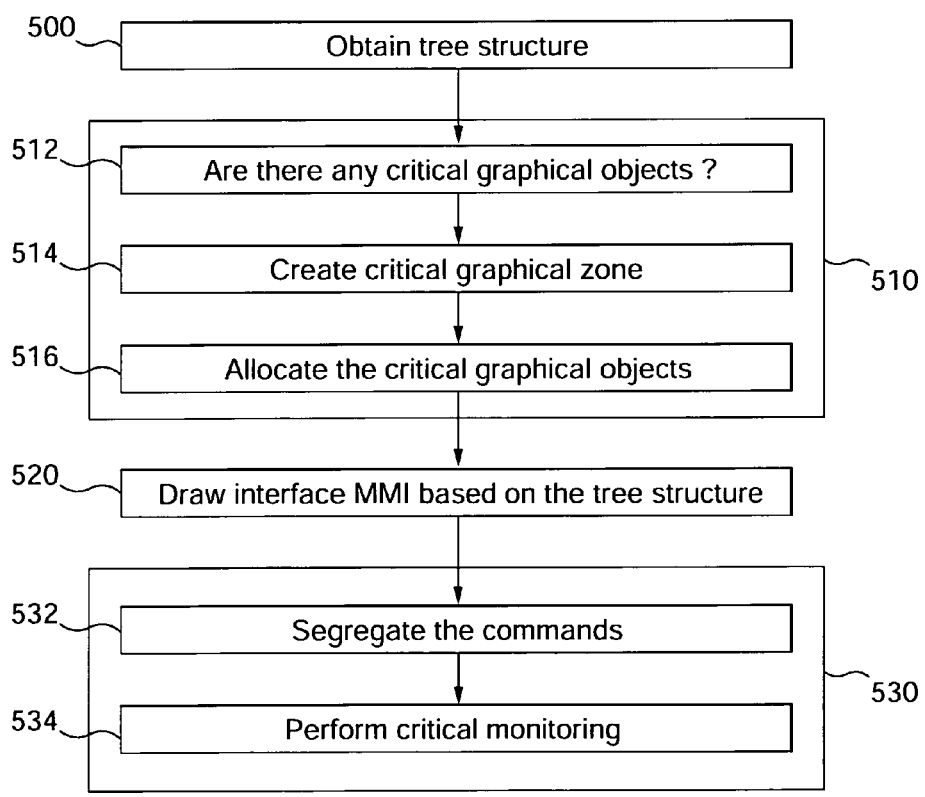
FIG. 5 represents, in flow diagram form, general steps of an embodiment of the invention.

As illustrated in FIG. 5, a method of monitoring a client application according to the invention comprises a step 500 of obtaining a plurality of graphical interaction objects having a tree-structure organization. This is in particular the tree of widgets defining the man-machine interface of the client application in question.

For example, step 500 consists of retrieving the binary file DF of the client application.

The monitoring method according to the invention continues at step 510 by the setting up of a critical graphical zone for monitoring.

For this, the monitoring system determines (step 512) the existence of critical graphical objects within the tree structure obtained, and obtains an identification for them, where applicable.

Figure 4:
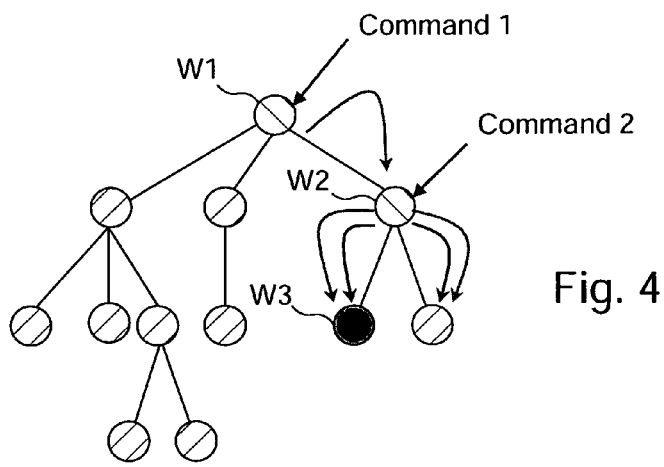
FIG. 4 illustrates the influence between widgets of a tree structure of widgets, consecutively to the reception of commands.

These critical graphical objects may have been defined in advance, for example through a configuration file for the critical widgets, listing the identifiers of objects to be considered as critical. This configuration file may be established manually by an operator according to considerations of criticality of the functions associated with the graphical objects and of interdependency of the graphical objects as illustrated by FIG. 4 above.

By way of example, this configuration file may be appended to the definition file DF of the tree structure.

In a variant relying on the implementation of self-testable widgets as described later, only the graphical objects provided with an internal control block and which are present in the tree structure obtained are identified as critical graphical objects. It is to be recalled here that the definition of each graphical object is stored in the widgets library 108. Thus, the monitoring system will determine, for each graphical object listed in the DF file, whether it is of self-testing type by polling the library 108, in which case that object will be considered as critical.

Once it has been determined that there are critical objects, the monitoring system creates a critical graphical display zone at step 514. Of course, several critical graphical zones may be created, if for example several groups of critical graphical objects can be determined at step 512.

Among the graphical objects available in the library 108, the monitoring system searches for a graphical object making it possible to define a display area and having the capability of being the parent of other graphical objects. To be precise, as described below, the critical graphical objects will be attached to that new graphical object defining the critical graphical zone.

By this new graphical object, a display area is thus defined which may easily be isolated from the rest of the display (that is to say from the display of the non-critical graphical objects).

This created new graphical object is then added to the tree structure obtained in step 500, thus concretely defining a new critical display area in the man-machine interface of the client application. In particular, to segregate that new critical area as much as possible from the rest of the non-critical graphical objects, the created new graphical object is directly attached to the root of the tree structure.

Next at step 516, the monitoring system modifies the tree-structure dependency of the critical graphical interaction objects to make them dependent from the created new graphical object which defines the critical zone. More particularly, as the created new graphical object may be a parent, it is possible to attach to it a certain number of child graphical objects, here the critical objects, which are required to be monitored.

Figure 6:
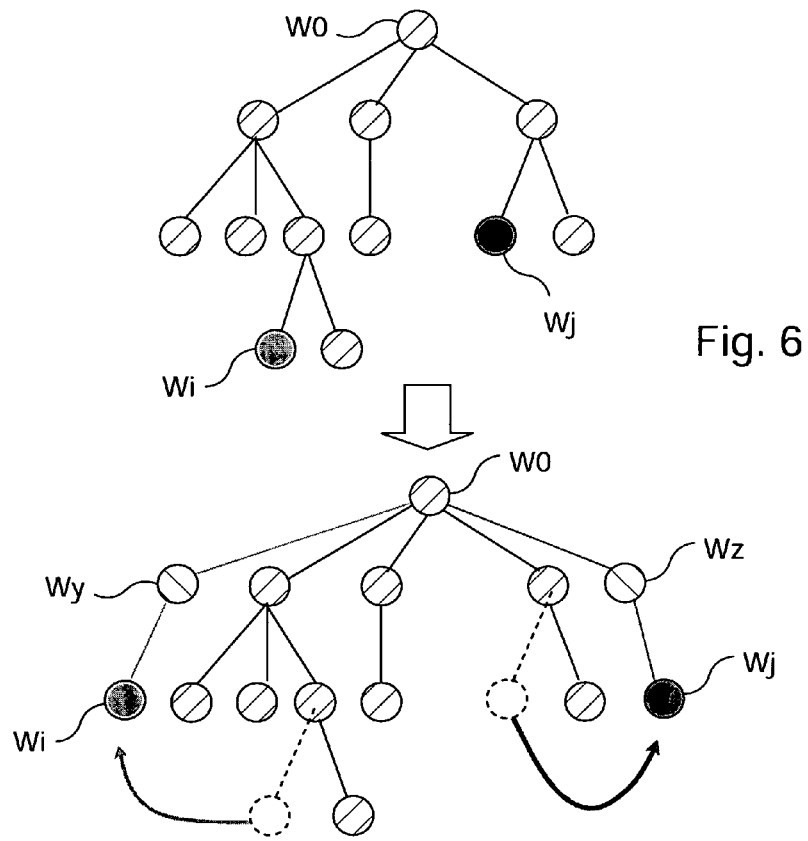
FIG. 6 is a diagrammatic illustration of the creation of a critical graphical zone according to the invention within a tree structure of widgets.

FIG. 6 illustrates this step 510 of setting up a critical graphical zone for monitoring. Step 512 makes it possible for example to identify the widgets Wi and Wj as critical, in the tree structure obtained (top of the Figure). Step 514 then creates two new widgets Wy and Wz to define two new critical display zones. These two new widgets are directly attached at the root W0 of the tree. Lastly, at step 516, the two critical widgets Wi and Wj are attached to the two new widgets created, respectively Wy and Wz, so as to include the critical widgets Wi and Wj in the two new critical display zones. As a variant, a single widget Wy could be provided to receive Wi and Wj.

Figure 10:
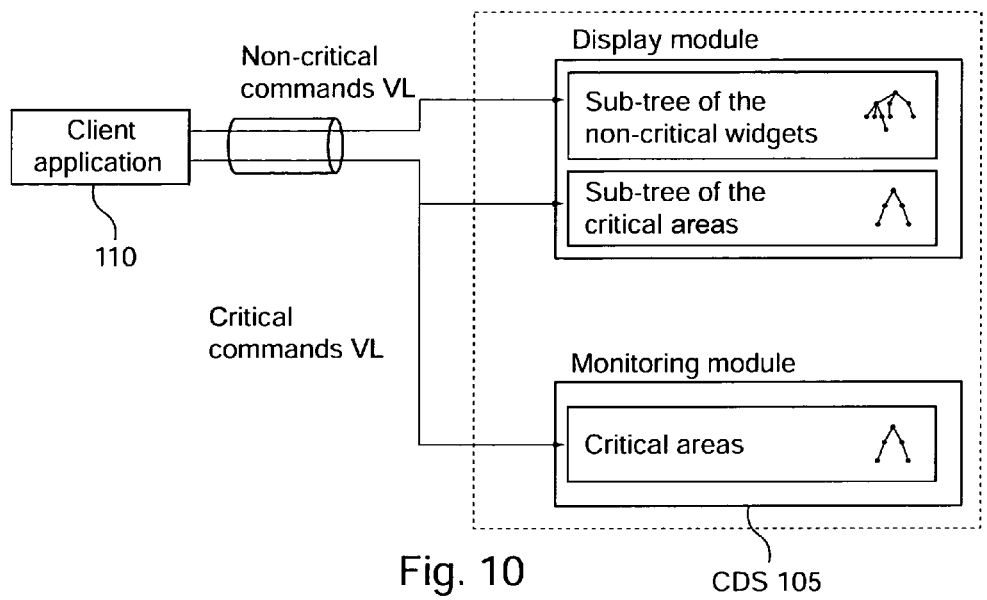
FIG. 10 illustrates the segregation of commands using a virtual link, according to an embodiment of the invention.

This method is simple to implement and imposes few constraints with regard to the client application (for example the requirement to manage the critical widgets independently of the rest of the page, as illustrated in the case of FIG. 10 described below).

Returning to FIG. 5, the CDS 105 draws and displays on the screen 115 the Interface MMI of the client application on the basis of the modified tree structure obtained further to step 516 (step 520). This conventional operation consists of instantiating, on the basis of the library 108, each graphical object of the DF file taking into account the new graphical objects created at step 514 and the new dependencies resulting from step 516.

Preferably, at the time of the instantiation, the critical graphical objects (that is to say those made dependent from the created new critical graphical zones) are associated with unique identifiers belonging to a reserved range of identifier values. This will make it easy to identify commands intended for those graphical objects and thus the commands to monitor.

Once the MMI graphical interface has been displayed, the monitoring system performs what is referred to as critical monitoring of that graphical interface (step 530). In particular, only the critical graphical objects attached to the critical zone (or to the critical zones) are monitored. Of course, the present invention may apply to a case in which two monitoring levels (or more) are implemented. The most restrictive (that is to say critical) monitoring is implemented according to the mechanisms of the invention, the other levels of monitoring then being applied to the non-critical graphical objects according to the meaning of the invention.

Step 530 comprises two steps: one, 532, for segregating the commands that are input (CI, CM) and output (display instructions for example) in order to identify those intended for or concerning critical graphical objects and thus to be monitored, and the other, 534, for ensuring the actual monitoring of the monitoring perimeter, that is to say of the critical graphical zones.

Step 532 of segregating the commands consists in part of sorting, among received commands intended for the graphical interaction objects of the tree structure, between the critical commands, intended for the critical graphical objects, and the non-critical commands intended for the other graphical objects. Thus, the monitoring according to the invention will be carried out on the critical commands only.

To be precise, all the commands CM received from the client application or commands for interaction CI intended for the critical zone (that is to say for the critical graphical objects) must be segregated from the rest. The monitoring system in the CDS server 105 is configured to extract, from among the stream of commands that are received, all the commands that modify the state of one of the critical graphical objects of the critical display zone.

As regards the commands for interaction CI for example, since the critical display zone is defined by a graphical object itself having a defined area, the identification of the commands CI intended for the critical zone may simply consist of identifying the interactions of a selecting means 120 (mouse pointer or touch interactor) on the critical objects by performing a test of inclusion of the event in the defined area, and/or of identifying the inputs of the keyboard when one of the critical objects is in a state accepting keyboard events for example when it is in focus or when it is in an editing state.

As regards the updated commands CM sent by the client application 110, the monitoring system can easily identify all the commands to monitor on account of the segregation of the graphical objects introduced by the creation of the new graphical objects attached to the root of the tree structure. Thus, the mere identification of the commands intended for the critical graphical objects of the critical zones (using their identifiers) is sufficient.

Where the created new graphical interaction object defines a critical graphical zone corresponding to a new display area distinct from the display areas of the non-critical graphical objects, the management of the display of the critical objects can be expected to cause no difficulty. On the other hand, when those different areas and zones are able to overlap, that is to say superpose in relation to each other at least partially, it should be verified that the display of the critical graphical objects is not perturbed by the display of the non-critical widgets. Adapted mechanisms are in particular provided in the following description.

The object of step 534 of actual monitoring of the critical graphical zones as created at step 510 is to ensure that the stream output from each graphical object that is critical, and thus monitored, is in accordance with all the commands CM received by the client application and interaction commands CI of the user and intended for those critical graphical objects. The output of a graphical object is either an event sent to the client application generally in response to an interaction by the user, or a display modified in response to an updating command issued by the client application (that is to say a display instruction).

To perform this monitoring operation, the monitoring system can in particular continuously store the state of each critical graphical object (that is to say the state resulting from the preceding commands CM and CI), analyze the impact of a received command CM or CI on the monitored graphical object concerned by that command, and lastly verify that the output of that graphical object (graphical instruction or event output to the client application) is indeed in accordance with the current state of the graphical object.

Figure 7:
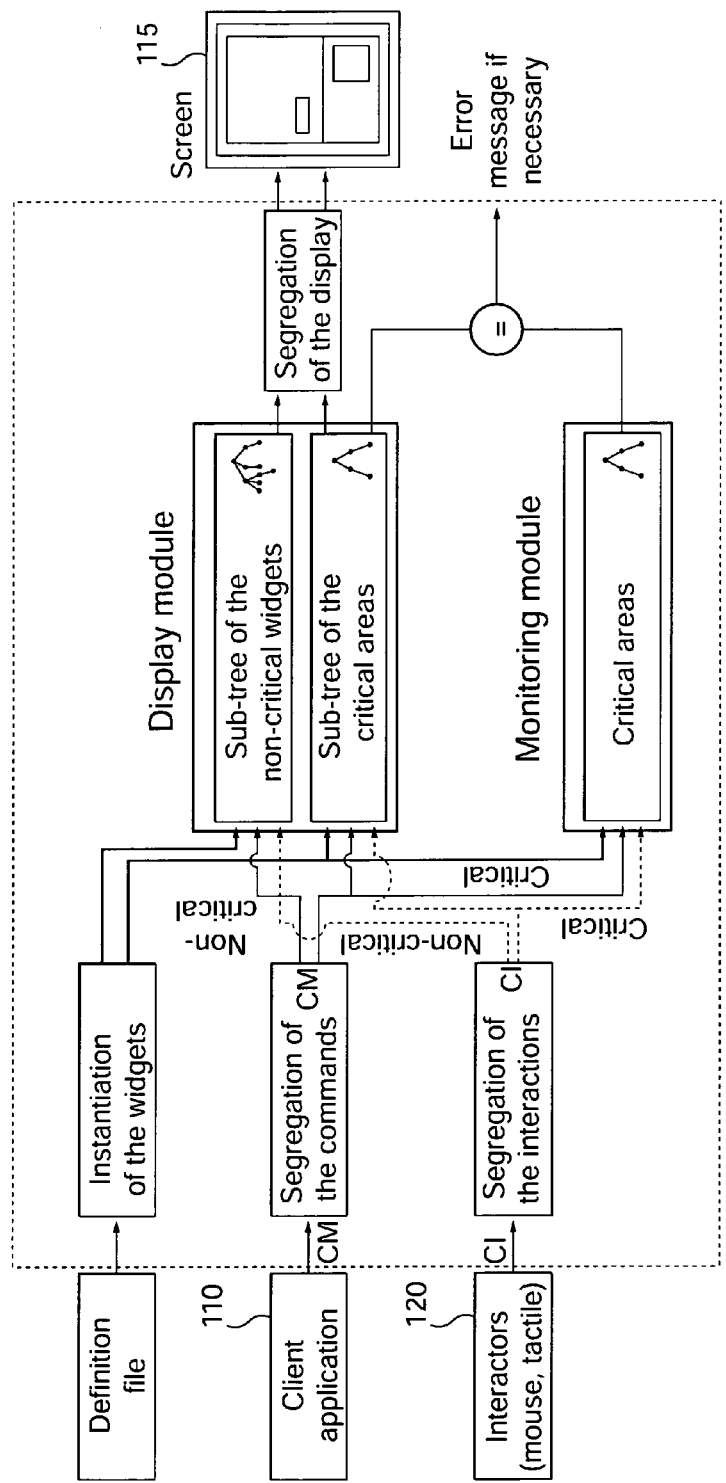
FIG. 7 illustrates, in the form of a function diagram, a CDS incorporating functions according to the invention.

FIG. 7 functionally illustrates a monitoring of graphical objects according to the invention.

Based on the definition file of the graphical interface MMI of the client application, this file having been modified to introduce the critical display zones and to attach thereto the critical objects as described earlier, each graphical object is instantiated in the display management server. The segregation of the critical zones makes it possible to distinguish a sub-tree of the non-critical graphical objects and a sub-tree of the critical graphical objects to monitor, these sub-trees being attached to the same root.

The display on the screen 115 is thus made on the basis of those sub-trees. As illustrated in the Figure, the critical graphical zone displayed may be distinct (that is to say without any superposition or overlapping) from the display area or areas of the non-critical graphical objects.

When the critical objects are monitored, the commands CM and CI received from the client application 110 and from the input and selection means 120 are separated between commands referred to as critical intended for the critical graphical objects, and commands referred to as non-critical intended for non-critical graphical objects.

All the received commands are sent to a display module for commanding the updating of the graphical interface or the sending of an event according to those commands.

In parallel, only the critical commands are sent to the module (functional block) for monitoring which proceeds with an evaluation of the output state of the critical objects concerned by those commands.

This evaluated output state is then compared to the actual output state of the corresponding critical object. In case of difference, a warning message may be issued for the user's attention.

A description is now made with reference to FIGS. 8 to 19 of in particular an embodiment of the invention for the Interface MMI of an Electronic Flight Instrument System (EFIS) represented on the screen of FIG. 1, in accordance with the ARINC 661 standard. This interface has been reproduced in FIG. 8 in which the references A to F, LS, VV, TX and SC enable the link with FIG. 9 to be made.

Of course, the mechanisms described below for that interface may be implemented, in whole or only in part, for other MMI interfaces.

The ARINC 661 standard provides a set of widgets which may be organized in tree form. The structure of the layers in which the graphical objects come to be displayed is defined statically through a definition file. Each layer is defined independently. Each widget may have a parent, thus defining a tree structure from a layer root widget. The "Container" type widgets enable a set of widgets to be grouped together. The "Panel" widget belongs to this type of widget.

The "Panel" is a widget that groups together several widgets within a rectangular zone to which cropping may be applied.

In the table below, the properties of the "Panel" widget have been represented, as defined in the aforementioned standard.

TABLE 2

| Parameters | Description |
| --- | --- |
| Commonly used parameters | |
| WidgetType | A661_PANEL |
| WidgetIdent | Unique identifier of the widget |
| ParentIdent | Identifier of the direct container of the widget |
| Visible | Visibility of the widget |
| Enable | Authorization of the widget to be activated |
| StyleSet | Reference to graphical characteristics predefined in the CDS |
| MotionAllowed | Capacity to be able to change the parameters PosX, PosY, SizeX, SizeY at the time of the execution phase |

TABLE 2-continued

| Parameters | Description |
| --- | --- |
| PosX | The X position of the reference point of the widget |
| PosY | The Y position of the reference point of the widget |
| SizeX | Width of the widget |
| SizeY | Height of the widget |

Figure 3:
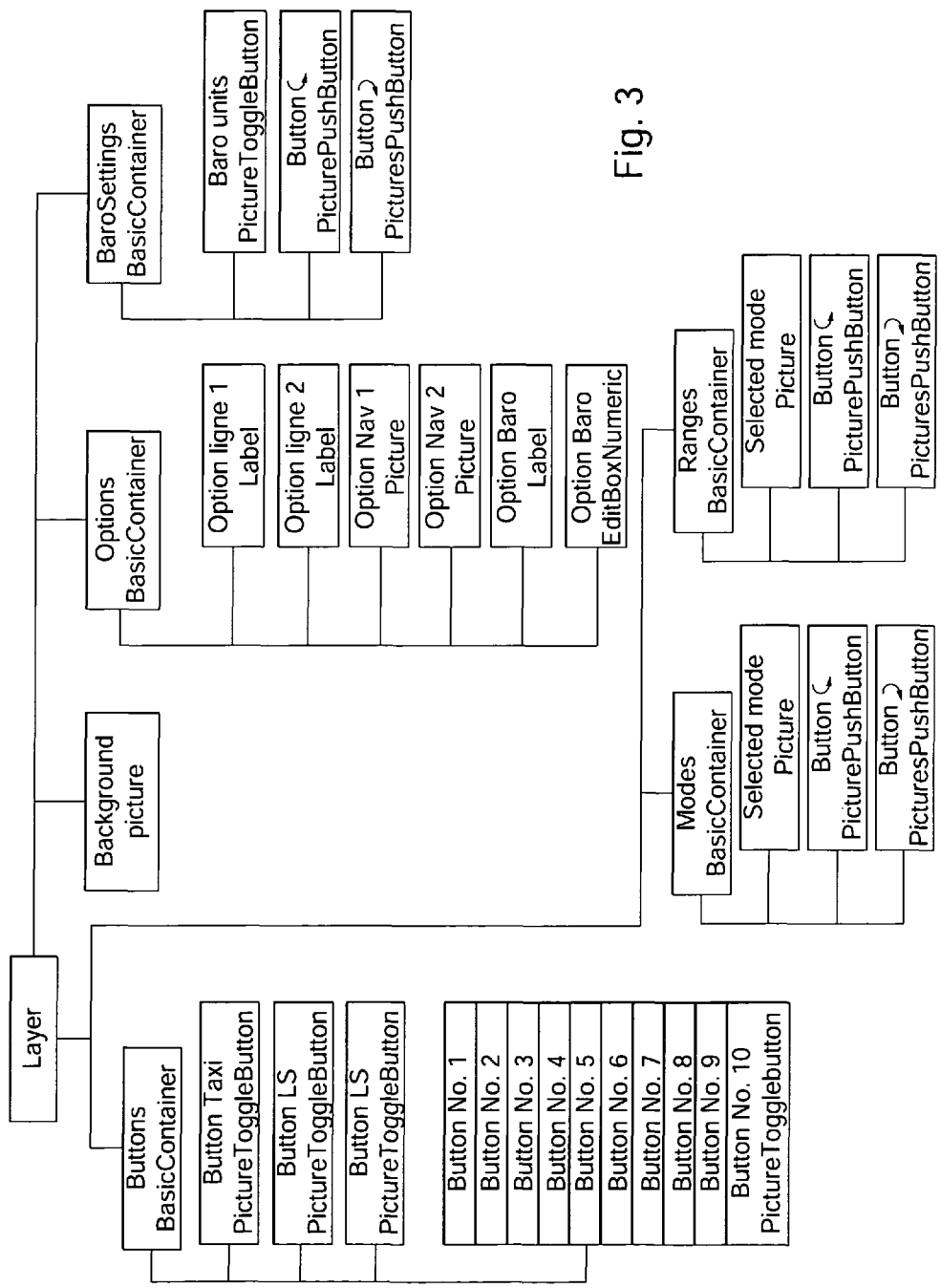
FIG. 3 illustrates another tree structure example for widgets corresponding to the graphical interface represented in FIG. 1.

The definition file DF for the graphical interface of the EFIS application is represented in FIG. 3.

To construct a critical area according to the meaning of the invention (step 510), a "Panel" widget is used that is directly attached to the root (that is to say that the "ParentIdent" property is set to 0 for the "Panel" widget created). The "Panel" widget is thus used here to define an area on which its child widgets (the critical widgets of the invention) will come to be drawn. It constitutes the critical area on which the monitoring will be applied.

The critical widgets that it is wished to render secure are attached to that "Panel" widget, for example by indicating in a property of those critical widgets ("ParentIdent") the unique identifier of the "Panel" widget in question. Of course, if an entire sub-tree proves to be composed uniquely of critical widgets, only the widget of lowest depth (the parent critical widget that is common to all in the tree) is attached to the "Panel" widget. By transitivity, its child critical widgets will also be attached to the critical zone defined by that "Panel" widget.

Once the critical area has been created, it is necessary to indicate to the monitoring manager that the area defined by that "Panel" widget is critical and that monitoring must be applied thereto.

This indication may be made through a static identification of the critical area or of the critical widgets, for example:
either by adjoining to the definition file DF a configuration file which contains all the critical widgets;
or by defining a range of identifiers that is reserved for the critical widgets and for the critical area. This solution has the advantage of avoiding the development of an additional file format, and of avoiding the downloading and the management of configuration for that additional file. As the range of the identifiers is 0-65535 per layer, it is easy to reserve a wide range for the critical widgets without penalty to the design of the remainder of the MMI.

To simplify the following explanations, it is assumed, in the example of the EFIS, that only the display of the barometric setting is critical (an incorrect setting leads to the display of an erroneous altitude). Of course, the explanations below may be applied in identical manner for a greater number of critical widgets or functions.

Figure 8:
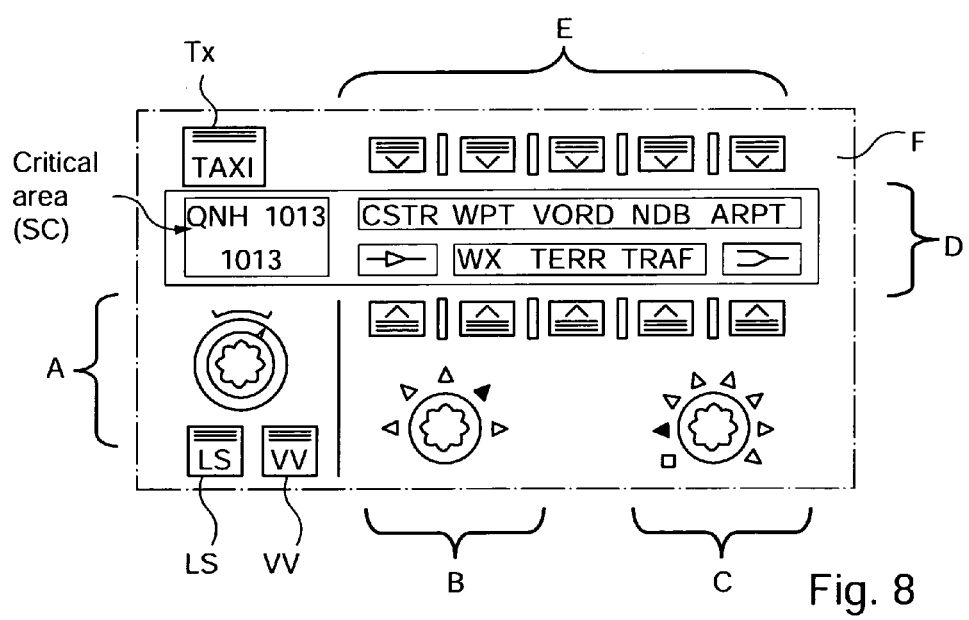
FIG. 8 represents an EFIS control panel including critical widgets.

The display of the widgets corresponding to the barometric setting is indicated in FIG. 8 by the reference SC: a widget label indicating "QNH" and an editing widget whose editing field here comprises the value "1013".

Figure 9:
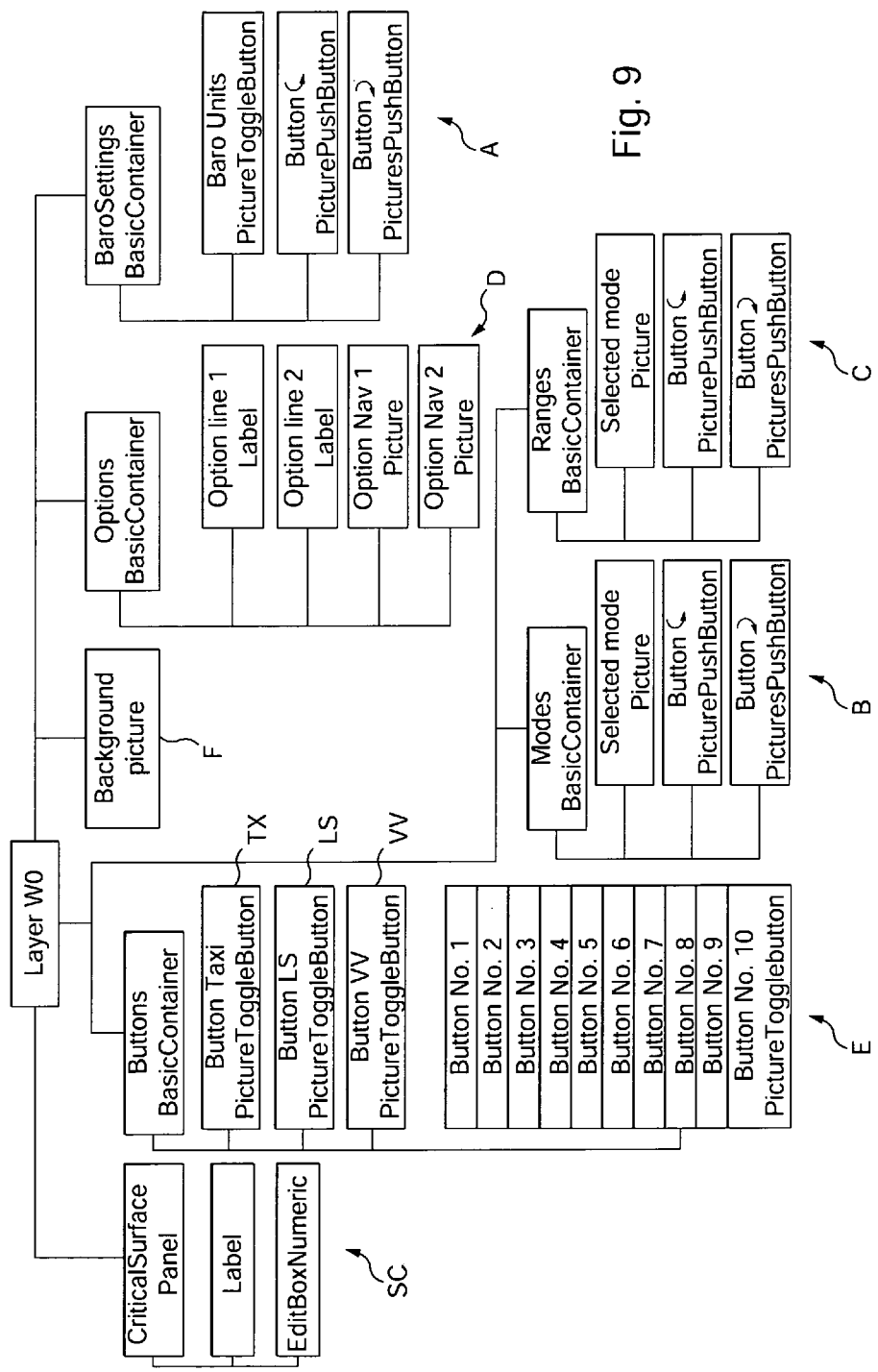
FIG. 9 represents a tree structure example for widgets according to the invention for the EFIS interface of FIG. 8.

FIG. 9 represents the tree structure of widgets further to step 510 of creating a critical display zone. In the case of this Interface MMI there is no overlapping or superposition of the widgets displayed. Thus, the new "Panel" widget created may take the same dimensions and positions as the "barometric setting" critical widget to monitor. The display of the interface MMI in this case appears unchanged for the user.

In the tree structure modified in accordance with the invention, the new "Panel" widget has been directly attached to the root of the current layer. Next, the two widgets defining the barometric setting have been attached to that new "Panel" widget.

Once the interface MMI has been displayed on the basis of the tree structure of FIG. 9, the monitoring system proceeds with the distinction between the critical commands to monitor and the non-critical commands.

In the link between the client application 110 and the CDS 105 (Ethernet, ARINC 429, etc.), the commands CM are sent in the form of blocks, each block identifying the layer concerned. Next, each command within a block identifies the widget to which that command is to apply.

Various implementations of the distinction applied to the CM commands may be provided. Two of them will be described below.

A first embodiment diagrammatically illustrated in FIG. 10 relies on the creation of a virtual link (VL) dedicated to the critical commands between the client application 110 and the CDS 105. In other words, two distinct virtual links or channels are used, one for the non-critical widgets and the other dedicated to the critical widgets.

For the client application 110 it is thus a matter of knowing which widgets are critical (for example via the aforementioned configuration file) in order to send the commands CM that are intended for them in the dedicated virtual link. Furthermore, a synchronization between the two virtual links must be provided in order to ensure a synchronized display between the critical widgets and those that are non-critical.

This solution is simple to implement for the display management server without needing to add an additional physical link between the client application and the CDS.

Figure 11:
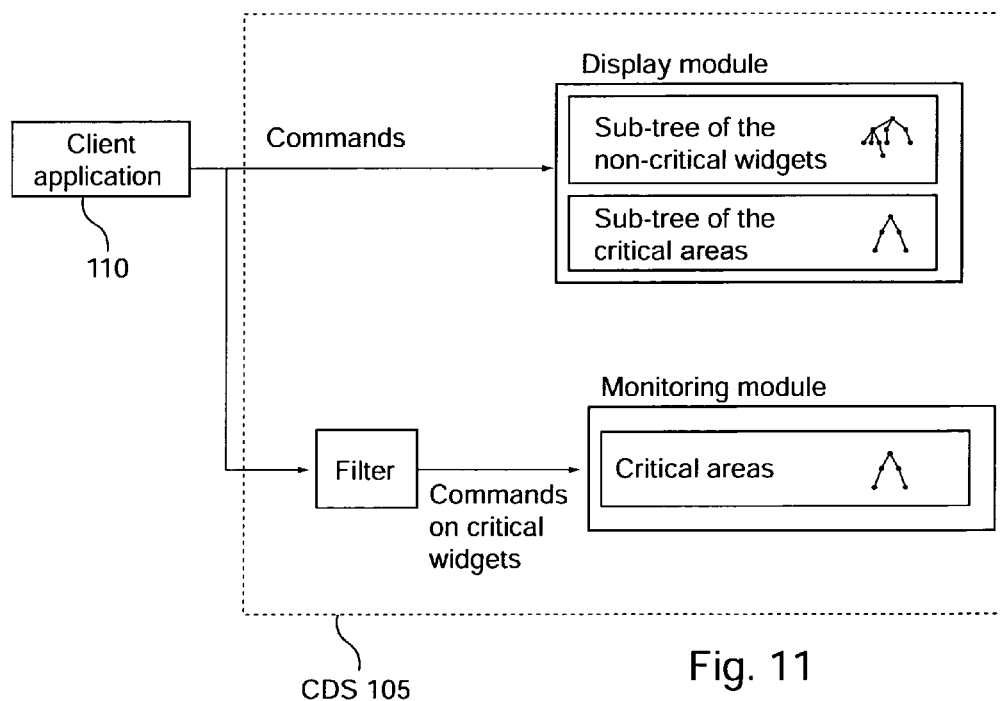
FIG. 11 illustrates the segregation of commands by filtering, according to an embodiment of the invention.

A second embodiment diagrammatically illustrated in FIG. 11 relies on the implementation of a sorting filter in the CDS 105. In the Figure, it has been decided to use a filter solely upstream of the monitoring module. Of course, other configurations may be envisioned.

The filter filters commands on reception of the block ARINC 661 so as to send only the critical commands to the monitoring module. On the other hand, the display module receives all the received commands.

The provided filter has the object of sorting the commands intended for the critical widgets from the others, by virtue of the identification that is made of the widgets at the time of their instantiation and by virtue of the identification indicated in the commands.

Contrary to the first embodiment, it is the display management server that has the task of sorting the commands in this configuration with a filter.

In the ARINC 661 standard there is a mode called "BufferFormat" enabling a command to be addressed to several widgets at the same time. It is clear that the first embodiment does not enable this mode to be taken advantage of on account of the segregation of the commands in the virtual links according to the criticality of the widgets concerned. On the other hand, this mutualization may be kept in the second embodiment with filtering, in which case the filter (or an upstream module) will be configured to convert a command in "BufferFormat" into a plurality of equivalent commands intended for each of the recipient widgets.

In the link between the input and selection means 120 and the CDS 105, it has already been possible to refer to the sorting of the commands CI using a test of inclusion of an interaction event in a critical graphical zone or of the identification of a keyboard input when a critical widget is active or in editing state. The sorting makes it possible to send the monitoring module solely the commands CI relative to the critical widgets.

The inclusion test relies in particular on the fact that the critical display zones must not be overlapped, which is not always the case. The MMI trace of the client application is also a source of uncertainty as to which widget a user interaction applies to, for example in case of superposition of the widgets.

In particular, the display instructions (whether they are the result of an interaction CI or of a command CM issued by the client application) may also be sorted to ensure that the trace instructions relative to the critical widgets do not perturb the non-critical display zone, and vice-versa. This is on account of the fact that the monitoring according to the invention is not carried out for all the widgets but only for the critical widgets.

Various mechanisms enabling this risk of overlapping to be dealt with may be provided.

Figure 12:
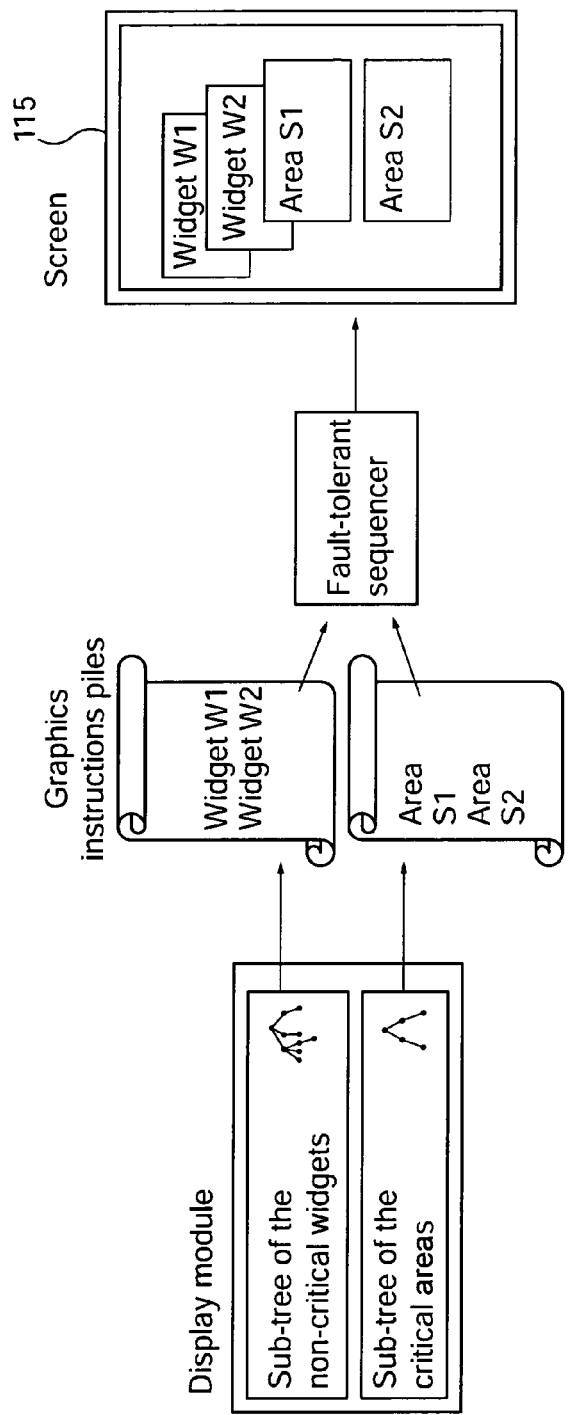
FIG. 12 illustrates the segregation of display for widgets by sequentially displaying them, according to an embodiment of the invention.

A first mechanism diagrammatically illustrated in FIG. 12 relies on the exclusive reservation of a display area for the display of a critical graphical zone. In other words, no other widget, whether it be critical or not, not attached to the critical graphical zone (that is to say to the corresponding "Panel" widget) must be able to be drawn on the reserved area. By providing this exclusive reservation, possible conflicts or uncertainties as to which widget a new user interaction would apply to are avoided.

To ensure this exclusive reservation, two mechanisms are implemented by the display management server.

First of all, an anti-collision mechanism makes it possible to ensure the absence of collision between the display areas of the two critical graphical zones according to the meaning of the invention. This mechanism may prove to be simple: a calculation of intersection between the critical display areas taken in pairs suffices.

Next, an anti-overlap mechanism makes it possible to ensure that no widget not attached to the critical display area will be drawn on that area. A possible anti-overlap mechanism consists of setting up sequential addressing of the display: in this case, the display of the graphical interaction interface on the basis of the tree structure first of all comprises a first step of executing display instructions relative to the non-critical widgets, followed by a second step of executing display instructions relative to the critical widgets. As the painter's algorithm applies (the last trace will be drawn over the preceding ones), it is thus ensured that what is displayed corresponds to the pile of graphical instructions relative to the critical display area.

This first embodiment is particularly well-adapted for interfaces MMI in which no widget must be drawn superposing on another. This is in particular the case for the EFIS control panel or for virtualization of the cockpit ceiling panel.

On the other hand, for the interfaces MMI possessing widgets capable of being displayed superposing, such as pull-out menus and pop-ups, it should be provided, as of the design of the interface MMI, that those widgets will never overlap a (or another) critical display area. This is because, otherwise, those widgets would be partially displayed or even not displayed at all (the critical display areas being on top on account of the painter's algorithm), which for the pilot leads to the inability, which may be partial, to interact with those widgets.

Furthermore, in the case of complex symbology produced from a set of widgets such as graphics primitives (GpLine, GpTriangle, GpLabel, etc.) and of which it is desired to provide security for only one of those elements, this first embodiment does not appear to be appropriate. Another display segregation mechanism is preferably to be used, as referred to below with reference to FIG. 14.

Figure 13:
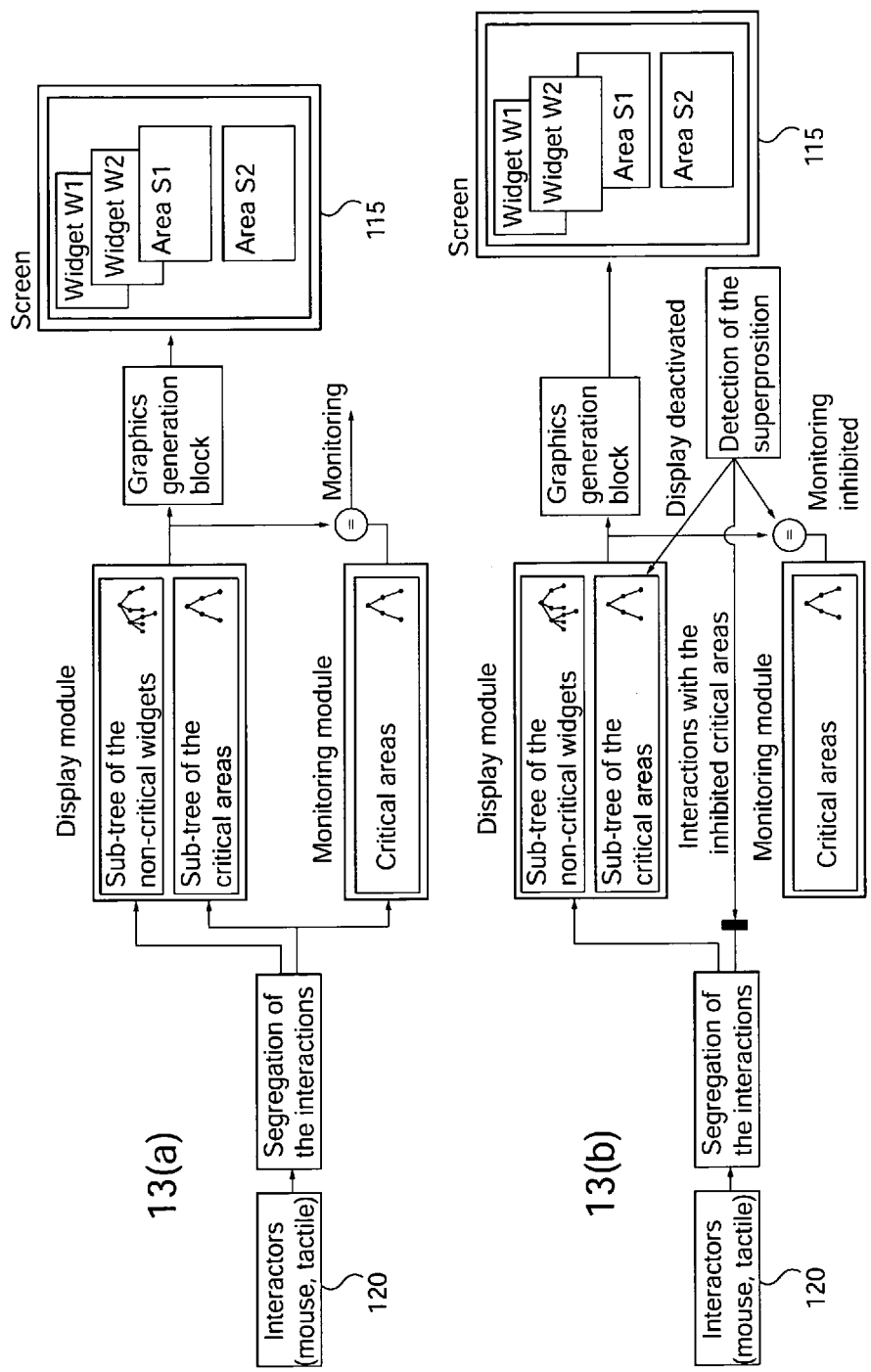
FIG. 13 illustrates mechanisms for managing the competing display of the critical widgets and the non-critical widgets according to the invention, in the absence of superposition (13a) and in case of superposition (13b)

A second mechanism diagrammatically illustrated in FIG. 13 relies on the non-exclusive reservation of a display area for the display of a critical graphical zone. In other words, non-critical widgets may be drawn over the critical graphical zone.

This mechanism comprises:
detecting when at least one non-critical widget is displayed with at least partial superposition on (that is to say over) the critical graphical zone comprising the critical widgets; and
inhibiting, for the duration of the superposition, functions of interaction of a user with the critical widgets. This inhibition may be accompanied by a modification of the rendering of the corresponding critical display area (for example by modifying the color), so as to warn the user, here a pilot, visually. The inhibition makes it possible to avoid the pilot not being able to interact with the critical display area in case of superposition. To be precise, firstly, the monitoring module does not know of the existence or of the nature of the superposing non-critical widget, and is thus unable to know whether the interactions of the pilot are addressed to the critical widgets or not. Secondly, if the pilot interacts with a critical widget, nothing ensures that the information he perceives from that widget has not been polluted by a non-critical widget.

Of course, as of detection of the end of superposition, the interactions with the critical widgets may resume, by eliminating the inhibition.

Moreover, it is preferable for the critical display area not to be concealed for too much time since the inhibition for example prevents the pilot from accessing critical functions.

For this, a countdown is provided for the duration of the superposition. Thus, the countdown is triggered on detection of the superposition, then, the case arising, a warning message is issued on expiry of the countdown. The warning message may be a sanction signaling that the critical display area is compromised. Preferably, this warning message is sent to the pilot such that the latter can move the superposing widget and free the critical display zones.

The top 13(*a*) of FIG. 13 illustrates the situation when no non-critical widget W1 or W2 is displayed with superposition of a critical graphical zone S1 or S2. The bottom 13(*b*) of the same Figure illustrates, on the other hand, the situation when a widget (here W2) is displayed superposing on a critical graphical zone (here S1).

The detection of the superposition triggers, in addition to the countdown, the inhibition of the interactions with the critical display areas (here S1), the deactivated display of those same areas (their updating is frozen, that is to say that the display is fixed) and the suspension of the monitoring of the critical widgets.

This detection of an overlap or superposition may rely on the use of a depth buffer memory, also known as a z-buffer. In this memory, which has the size of the display zone, for each pixel of the display, the depth of the widget to be drawn is stored, knowing that when for one pixel two widgets superpose, only the depth of the least deep object is stored. In practice, the z-buffer stores the identifier of the widget object to display in each corresponding pixel, it being possible for example for the depth of that widget object to be retrieved from the tree structure.

Once the trace of the interface MMI has terminated, it suffices to verify, for each pixel of the critical display areas, that the depth stored in the depth buffer corresponds to a critical widget. If that is not the case, superposition has been detected.

To ensure the monitoring of the critical display area by the monitoring manager, the graphical instructions relative to the critical widgets should be retrieved (in order to verify whether they correspond to the commands CM and CI received). For this, markers may be provided at the location of these "critical" instructions in the graphical instructions pile, the markers being added at the time of the generation of those instructions by the display module.

Although the principles described above may apply to the majority of the cases of interfaces MMI, there are some particular cases that the person skilled in the art will know how to apprehend the case arising. Such is the particular case of symbology produced via widgets of graphics primitives (GPxxxx).

Figure 14:
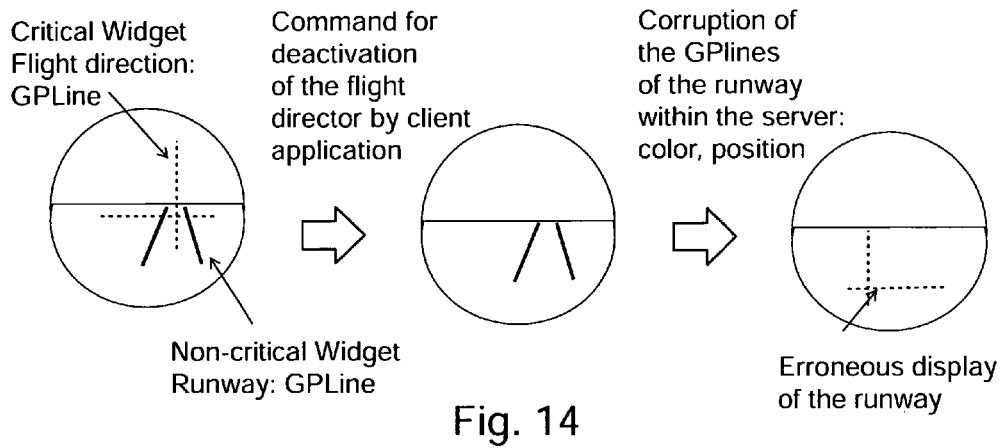
FIG. 14 illustrates an example of compromise of a PFD graphical interface (PFD standing for "Primary Flight Display") drawn on the basis of widgets of graphics primitives.

This particular case is illustrated by FIG. 14, showing a primary flight display (PFD) which, on a background, is constituted by a first critical widget (primitive "GPLine") indicating the direction of flight and by a second non-critical widget (also primitive "GPLine") indicating the runway.

Both approaches indicated above prove to be insufficient to provide security for the display of that symbology. To be precise, it is almost impossible to ensure that errors on non-critical widgets do not corrupt the display of the critical widgets. In the example of the Figure, the non-critical widget GPLine of the runway has been corrupted: modification of color and position (illustration on the right). This display would thus be capable of misleading the pilot.

Additional mechanisms of display segregation between the widgets of primitives should thus be provided. In an embodiment, security is provided for the widgets by using specific styles for the critical widgets (for example a halo effect around displayed critical widgets enabling the pilot to identify the critical elements with certainty).

Another particular case referred to here concerns the transparent widgets, that is to say those permanently covering the critical display area but for which no information is visible on the screen 115 for the pilot. Such transparent widgets are generally used to intercept the pilots interactions To ensure efficient monitoring in this case, it may be provided that the display module is configured to prevent that type of widget intercepting the interactions if they are intended for a critical display area.

Once the display instructions and commands have been sorted to enable the monitoring module to receive those relative to the critical widgets, this module proceeds with the actual monitoring, that is to say with the verification of the conformity between an output of a critical widget and an output estimated by the monitoring module for that same widget, on the basis of the same received command.

Until now reference has been made to a monitoring module to perform this monitoring operation. Thus, such a module may be provided to perform overall monitoring of all the critical widgets.

In a variant, this monitoring module is composed of a plurality of modules hosted in the critical widgets themselves. These widgets provided with a specific monitoring function are named hereinafter "self-testable widgets"

Figure 15:
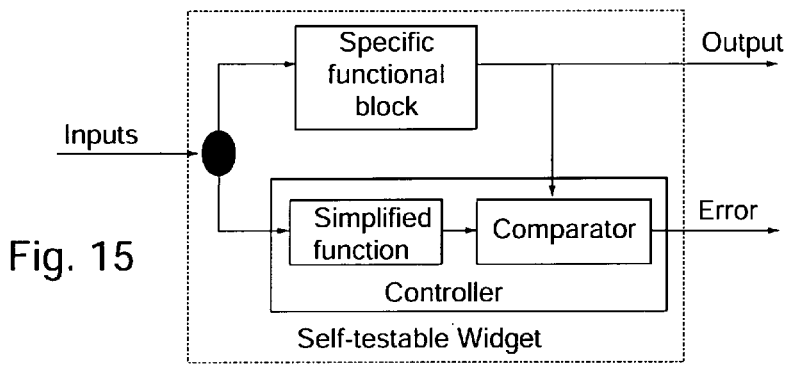
FIG. 15 illustrates the concept of self-testable widget according to the invention.

This embodiment is comparable to object-oriented monitoring, in which each critical widget is a data object including a specific function and a control or monitoring function, as shown in FIG. 15.

A self-testable widget enables monitoring of all the inputs and outputs of the widget, with total detection cover for faults. Due to the resources that it requires, it is advantageously implemented when the interface MMI comprises few critical widgets, for example at most about ten.

The specific functional block describes the specific behavior of the widget, that is to say the states of the widget, the management of the commands CM (set_parameter) issued by the client application, the events issued by the widget, the interaction commands CI received from the input and selection means 120 and the graphical rendering of the widget.

The control block includes a specific theoretical determination module to perform a simplified function of the function of the widget, and a specific comparator for comparing the theoretical output message from the theoretical determination module with a corresponding output of the functional block.

The simplified function is in particular a reduced model of the behavior of the widget, having as object the verification of the properties that it is desired to monitor. Thus, it is possible to limit the monitoring to certain properties only. For example, a reduction in complexity may consist in not taking into account the parameters linked to the graphical rendering, for example the focus when the cursor is on the widget.

The comparator has the role of verifying the consistency between the results of the functional block and the simplified model of the function. The comparisons made make it possible to check the consistency of the outputs according to the input commands. An error message is issued where appropriate according to the result of the comparison.

Figure 16:
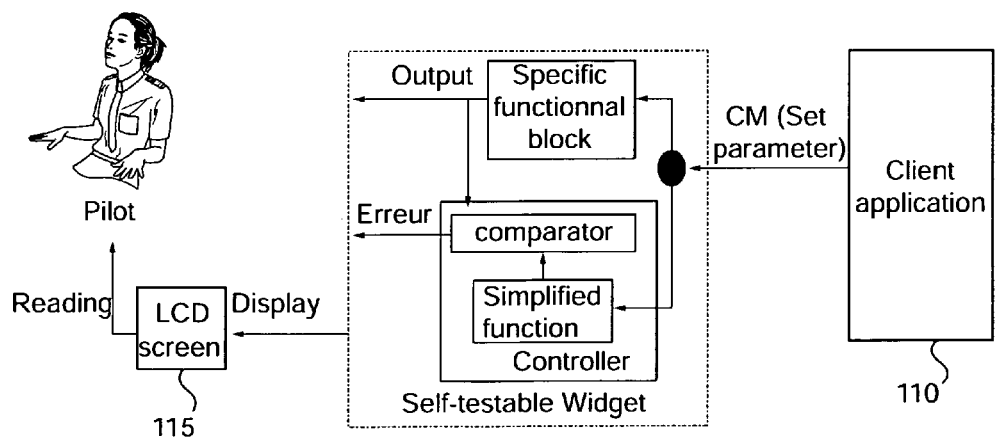
FIG. 16 illustrates the monitoring, by a self-testable widget, of a stream of commands issued by a client application, according to the invention.

FIG. 16 illustrates this check on reception of a command CM from the client application to perform an update of the display. The operation provided in relation to the self-testable widget is the following:

duplication of the CM command received (set_parameter) sent to the functional block and to the checking block;

parallel processing of this command CM by the functional block (conventional operation of the widget) and by the simplified function. Then sending the results to the comparator;

comparison of the results by the comparator. If there is any inconsistency, an error is noted, otherwise the output from the functional block is sent for display.

In similar manner, FIG. 17 illustrates the checking on reception of an interaction command CI for sending an event message to the client application. The operation provided in relation to the self-testable widget is the following:

the events CI of the input and selection means 120 initiated by the user are duplicated to the functional block and the checking block;

the functional block and the simplified function perform parallel processing of the event according to the internal state of the widget. The results of the two blocks are next sent to the comparator.

the comparator performs a comparison of the results. If there is any inconsistency, an error is noted, otherwise the output from the functional block is sent to the client application 110. Of course, this sending may be accompanied by an update of the widget due to the interaction made by the user.

FIG. 18 illustrates the communication schema for a "PushButton" widget (according to the ARINC 661 standard) rendered self-testable according to the invention.

Different interaction events CI may be received by the "PushButton" widget: MouseClicked, MouseReleased and MouseDown, which are well-known to the person skilled in the art.

Different parameters may be modified by the client application via a command CM (set_parameter): Visible, Enable, LabelString and Styleset, also known to the person skilled in the art.

In response to an interaction CI by the user, the assertion or rule of the "PushButton" widget is the following:

Event A661_EVT_SELECTION sent to the client application 110 if: reception of Event ProcessMouseclick and enable=true and visible=true.

Several cases of failure may thus occur:

satisfaction of the whole of the condition (reception of the event ProcessMouseclick and enable=true and visible=true) without the event A661_EVT_SELECTION being sent;

lack of reception of the event ProcessMouseClick whereas the event A661_EVT_SELECTION has been sent;

enable=false and/or visible=false, whereas the event A661_EVT_SELECTION has been sent.

In this rather simple case, the simplified function is identical to the specific function of the widget, and thus reproduces the assertion/rule defined above depending both on the input command CI and on the current states enable and visible of the widget.

Figure 19:
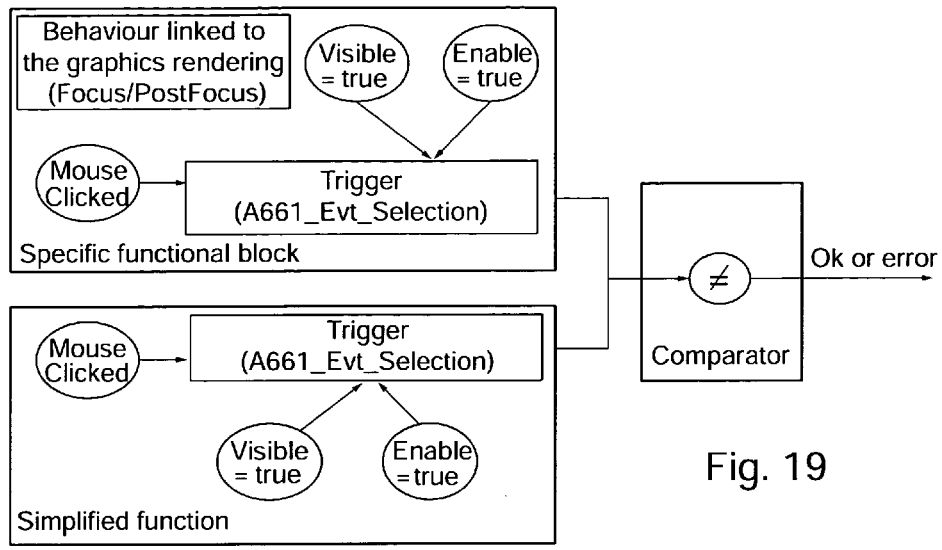
FIG. 19 illustrates the comparison structure within the self-testable widget of FIG. 18.

The monitoring of the widget with regard to one of these failures is illustrated by FIG. 19. The specific functional block and the simplified function determine, each independently of the other, the result of the above rule. A comparison of the outputs of the functional block and of the simplified function (theoretical or estimated output) then enables one of those failures to be detected.

As regards the response of the widget to a command CM (set_parameter) issued by the client application, the monitoring may consist of detecting any corrupted value on the parameters for which information is included in the command CM.

For the parameter LabelString (a string), let labelstring_F be the output value of the specific functional block and labelstring_C be the estimated output value of the simplified function. If the comparator detects that labelstring_F≠labelstring_C, then an error is noted.

An identical approach may be applied for the other parameters Visible, Enable and Styleset.

The aspects of the invention described earlier make it possible to achieve full monitoring of the critical widgets (both the interaction events CI and the parameter modifications CM issued by the client application), in particular via "self-testing" widgets. The approach adopted furthermore relies on a generic monitoring architecture applicable to any type of widget (command, input or display). Lastly, the critical display area construction method according to the invention enables the critical widgets to monitor to be optimized, both in terms of their display and in terms of their use.

Figure 20:
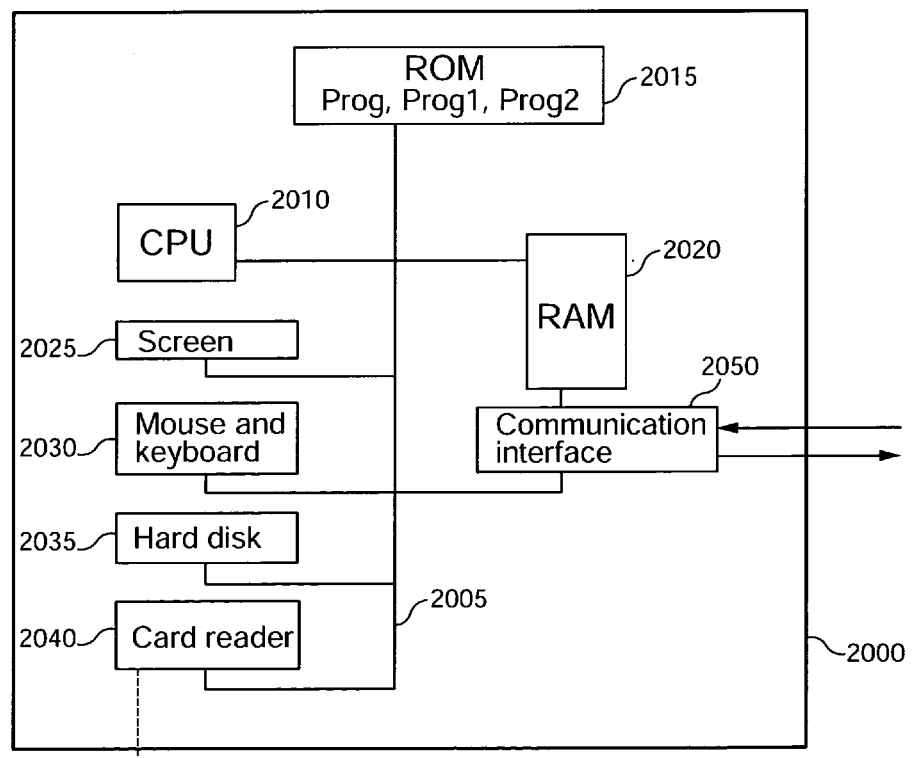
FIG. 20 illustrates an example of hardware architecture adapted to implement certain steps of the invention, in particular for monitoring critical widgets.

FIG. 20 illustrates an example of hardware architecture, for example a server or a computer, adapted to implement some of the steps of the invention, in particular the steps implemented for the monitoring. The device 2000 here comprises a communication bus 2005 to which there are connected:

one or more Central Processing Units (CPUs) or microprocessors 2010;

a read only memory 2015 (ROM) able to contain programs (prog, prog1 and prog2) necessary for the implementation of the invention;

a random access memory (RAM) or cache memory 2020, comprising registers adapted to record variables and parameters created and modified during the execution of the aforementioned programs; and, a communication interface 2050 adapted to transmit and to receive data.

The device 2000 also preferably possesses the following components:

one or more display units 2025 making it possible to view data and able to serve as a graphical interface with a user who will be able to interact with programs according to the invention, using a keyboard and a mouse 2030 or another pointing device such as a touch screen or a remote control;

a hard disk 2035 able to contain the aforesaid programs as well as information processed or to be processed according to the invention; and a memory card reader 2040 adapted to receive a memory card 2045 and to read or write thereon data processed or to be processed according to the invention.

The communication bus allows communication and interoperability between the different elements included in the device 2000 or connected to it. The representation of the bus is non-limiting and, in particular, the central processing unit may communicate instructions to any element of the device 2000 directly or by means of another element of the device 2000.

The executable code of each program enabling the programmable device to implement the methods according to the invention may be stored, for example, on the hard disk 2035 or in read only memory 2015.

According to a variant, the memory card 2045 can contain information, in particular information to process according to the invention, as well as the executable code of the aforementioned programs which, once read by the device 2000, is stored on the hard disk 2035.

According to another variant, the executable code of the programs and the information to process according to the invention may be received, at least partially, via the interface 2050, in order to be stored in identical manner to that described previously.

More generally, the program or programs as well as the information to process according to the invention may be loaded into one of the storage means of the device 2000 before being executed.

The central processing unit 2010 will control and direct the execution of the instructions or portions of software code of the program or programs according to the invention, these instructions being stored on the hard disk 2035 or in the read-only memory 2015 or in the other aforementioned storage elements. On powering up, the program or programs which are stored in a non-volatile memory, for example the hard disk 2035 or the read only memory 2015, are transferred into the random-access memory 2020, which then contains the executable code of the program or programs according to the invention, as well as registers for storing the variables and parameters necessary for implementation of the invention.

Naturally, to satisfy specific needs, a person skilled in the art will be able to apply modifications in the preceding description.

The invention claimed is:

1. A method of monitoring a computer system generating graphical images to be displayed in an aircraft cockpit, wherein the computer system generates an image of a graphical interface of a client application on the basis of a tree structure of graphical interaction objects composing said graphical interface, said method comprising:

(a) obtaining graphical interaction objects arranged in a tree-structure organization;

(b) selecting one of the graphical interaction objects and designating the selected graphical interaction object as a critical graphical interaction object, wherein the critical graphical interaction object has a dependency on another one of the graphical interaction objects in the tree-structure organization;

(c) creating and adding to said tree structure, a new graphical interaction object which defines a critical graphical display zone;

(d) modifying the dependency in the tree-structure organization of the critical graphical interaction object to depend from the new graphical interaction object and to remove the dependency on the another one of the graphical interaction objects;

(e) repeating steps a to d at least once with respect to another critical graphical interaction object;

(f) displaying the critical graphical interaction objects in the critical graphical display zone on a display screen connected to the computer system, and (g) performing critical monitoring of the critical graphical interaction objects and the new graphical interaction object, wherein the critical monitoring is not performed on the graphical interaction objects which are not one of the critical graphical interaction objects or one of the graphical interaction objects on which depends the critical graphical interaction objects.

2. The method according to claim 1, wherein at least one of the new graphical interaction objects is directly attached to a root of the tree structure organization.

3. The method according to claim 1, wherein said critical graphical zone corresponds to a display area on the display screen distinct from display areas of the graphical interaction objects which were not identified in step b.

4. The method according to claim 1, further comprising:
receiving commands to the computer system corresponding to the graphical interaction objects of the tree structure;
classifying the received commands as critical commands if the received command corresponds to at least one of the critical graphical interaction objects and as non-critical commands if the received command corresponds to at least one of the graphical interaction objects not identified as a critical graphical interaction object; and
the critical monitoring includes monitoring of the critical commands to the exclusion of monitoring the non-critical commands.

5. The method according to claim 1, further comprising:
receiving a command by the computer system wherein the command corresponds to one of the critical graphical interaction objects;
generating an output message using the corresponding critical graphical interaction object in response to the received command;
the critical monitoring of a critical graphical interaction object comprises, for the received command, comparing the output message generated using the corresponding critical graphical interaction object and a theoretical output message determined on the basis of the received command, and generating an error message if the comparison indicates a difference between the theoretical output message and the output message generated by the corresponding graphical interaction object.

6. The method according to claim 5, wherein at least one of the critical graphical interaction objects is a data object comprising a functional block corresponding to a specific function of the critical graphical interaction object, and a control block for performing said comparison.

7. The method according to claim 6, wherein the control block of the at least one of the critical graphical interaction objects comprises a functional block configured to perform specific function of the critical graphical interaction object, and a comparator configured to compare an output of the functional block with a corresponding theoretical output of the functional block.

8. The method according to claim 1, further comprising first executing display instructions relative to the non-critical graphical interaction objects, and thereafter of executing display instructions relative to the critical graphical interaction objects.

9. The method according to claim 1, further comprising the steps of:
detecting when at least one of the non-critical graphical interaction objects is displayed with at least partial superposition on the critical graphical zone; and
inhibiting, for the duration of the superposition, functions of interaction of a user with the critical graphical interaction objects.

10. The method according to claim 9, wherein detecting the superposition comprises updating a depth table, wherein the depth table stores for each display pixel a depth of the least deep graphical object at the location of that pixel, and further comprises determining a pixel in the critical graphical zone and whose depth stored in the depth table corresponds to a non-critical graphical interaction object.

11. A system for monitoring a graphical interface in a computer system of an aircraft cockpit, comprising:
a display module to control a display of a graphical interface of a client application based on a tree structure of graphical interaction objects composing said graphical interface;
a processor executes to perform the following steps:
(a) obtain graphical interaction objects having a tree-structure organization;
(b) select one of the graphical interaction objects and designate the selected graphical interaction object as a critical graphical interaction object, wherein the critical graphical interaction object has a dependency on another one of the graphical interaction objects in the tree-structure organization;
(c) create and add to said tree structure a new graphical interaction object which defines a critical graphical display zone;
(d) modify the dependency in the tree-structure organization of the critical graphical interaction object to depend from the new graphical interaction object and to remove the dependency on the another one of the graphical interaction objects;
(e) repeat steps a to d at least once with respect to another critical graphical interaction object;
(f) display the critical graphical interaction objects in the critical graphical display zone on a display screen connected to the computer system, and
(g) perform critical monitoring of the critical graphical interaction objects and of the new graphical interaction object, wherein the critical monitoring is not performed on the graphical interaction objects which are not one of the critical graphical interaction objects or one of the graphical interaction objects on which depends the critical graphical interaction objects.

12. The system according to claim 11, wherein the instructions further cause the computer system to command the execution of the display instructions relative to the non-critical graphical objects, before the execution of the display instructions relative to the critical graphical interaction objects.

13. The system according to claim 11, wherein the instructions further cause the computer system to:
detect a non-critical graphical interaction object displayed with at least partial superposition on the critical graphical zone comprising the critical graphical interaction objects; and inhibit, for the duration of the superposition, functions of interaction of a user with the critical graphical interaction objects.

14. An aircraft comprising:
an aircraft cockpit;
a display in the aircraft cockpit presenting a graphical interface of a client application;
a display module to control the graphical interface of the client application based on a tree structure of graphical interaction objects composing the graphical interface;
a monitoring system including a processor executing the following steps:
   (a) obtain graphical interaction objects having a tree-structure organization;
   (b) select one of the graphical interaction objects and designate the selected graphical interaction object as a critical graphical interaction object, wherein the critical graphical interaction object has a dependency on another one of the graphical interaction objects in the tree-structure organization;
   (c) create and add to said tree structure a new graphical interaction object which defines a critical graphical display zone;
   (d) modify the dependency in the tree-structure organization of the critical graphical interaction object to depend from the new graphical interaction object and to remove the dependency on the another one of the graphical interaction objects;
   (e) repeat steps a to d at least once with respect to another critical graphical interaction object;
   (f) display the critical graphical interaction objects in the critical graphical display zone on the display, and
   g) perform critical monitoring of the critical graphical interaction objects and of the new graphical interaction object, wherein the critical monitoring is not performed on the graphical interaction objects which are not one of the critical graphical interaction objects or one of the graphical interaction objects on which depends the critical graphical interaction objects.

* * * * *